United States Patent
Xun et al.

(10) Patent No.: US 7,551,372 B2
(45) Date of Patent: Jun. 23, 2009

(54) IMAGE EXPANDING LENSES, DISPLAY DEVICES AND ELECTRONIC DEVICES

(75) Inventors: Xiadong Xun, Schaumburg, IL (US); Zili Li, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 83 days.

(21) Appl. No.: 11/874,210

(22) Filed: Oct. 18, 2007

(65) Prior Publication Data
US 2009/0103191 A1    Apr. 23, 2009

(51) Int. Cl.
G02B 17/00    (2006.01)
G02B 3/00    (2006.01)
G02B 27/10    (2006.01)
G02B 27/20    (2006.01)

(52) U.S. Cl. .................. 359/737; 359/625; 359/802
(58) Field of Classification Search .................. 359/619, 359/625, 626, 802, 592, 594, 737; 349/57, 349/112; 345/32
See application file for complete search history.

(56) References Cited

U.S. PATENT DOCUMENTS

| | | |
|---|---|---|
| 5,828,410 A | 10/1998 | Drapeau |
| 6,211,932 B1 | 4/2001 | Hgahama et al. |
| 6,927,908 B2 | 8/2005 | Stark |
| 2006/0209565 A1 | 9/2006 | Naberhuis et al. |
| 2007/0058228 A1 | 3/2007 | Suzuki et al. |

FOREIGN PATENT DOCUMENTS

| | | |
|---|---|---|
| JP | 2005188340 A | 7/1993 |
| KR | 20030010443 A | 2/2003 |

*Primary Examiner*—Alicia M Harrington
(74) *Attorney, Agent, or Firm*—Hisashi D. Watanabe

(57) ABSTRACT

Disclosed are image expanding lenses, display devices, and electronic devices incorporating the disclosed image expanding lenses. In accordance with a disclosed image expanding lens, the image viewed by the user is larger than the active area of the LCD panel underneath the lens, so that the border around, for example, the LCD display is hidden from viewing. The image expanding lenses may include a non-uniform transparent substrate, having for example, a wedge shape that may be the top surface of the display. The substrate in combination with prismatic films may bend the light output from an array of pixels so that the image hides the border of the display device. In this way, an electronic device can render an edgeless image to a viewer since the image of the electronic device is projected beyond an edge of the display device of the host electronic device.

19 Claims, 4 Drawing Sheets

Original

After expansion

IMAGE EXPANDING LENSES, DISPLAY DEVICES AND ELECTRONIC DEVICES

FIELD OF THE INVENTION

Disclosed are image expanding lenses, display devices, and electronic devices incorporating the disclosed lenses, and more particularly, lenses, wedge-shaped substrates, and prismatic film combinations for expanding an image of a display device so that it hides a border surrounding the display screen of the display device, providing a borderless display to give the device the look of a borderless device.

BACKGROUND

The makers of mobile communication devices, including those of cellular telephones, are increasingly adding functionality to their devices. For example, cellular telephones include display features such as still and video cameras, video media streaming and two-way video calling. While there is a trend toward the inclusion of more display features and improvements for current features, there is also a trend toward smaller mobile communication devices. As mobile communication device technology has continued to improve, the devices have become increasingly smaller. Accordingly, manufacturers have less area for placement of displays on the smaller mobile communication devices.

While there is a trend toward smaller devices, there is also an industrial trend toward thin edged mobile communication devices trending towards a borderless display to give the device the look of a borderless device or phone. However, the perimeter edges of a display include many elements that can contribute to a visible border around the display. A current liquid crystal display (LCD) has many contributors to add to its border, such as wire traces, a bezel, a gasket and a housing. In addition, cellular phones or other devices have their housing which contributes to the visible border. It is very challenging to remove some or all of the border elements of the existing display structures or device structures.

One manner in which to enlarge the image of a display is to use a standard positive Fresnel lens that magnifies the image. However, when incorporated with an LCD display, the coarse grooves of the lens create moiré patterns which largely affect the image quality. In general however, a substrate, not a lens, is the top surface of a display of a mobile communication device. Prismatic films are widely used in LCD backlight modules, usually on a flat substrate. The films are for illumination and cannot expand the image.

DETAILED DESCRIPTION

With the industrial trend toward a borderless display, a mobile communication device with no visible border or ultra-thin boarder is desirable. A generic solution for a borderless display suitable for mainstream LCD displays is desirable, as well as for other emerging direct-view display technologies such as organic light-emitting diode (OLED) or electrophoretic displays (E-ink). It is preferable that the borderless display include good image quality, an optional floating-on surface image, and a future path to thinner display devices. It is also desirable that such a solution have a minimal impact on the thickness of the display device.

Disclosed are image expanding lenses, display devices, and electronic devices incorporating the disclosed image expanding lenses. In accordance with a disclosed image expanding lens, the image viewed by the user is larger than the active area of the LCD panel underneath the lens, so that the border around, for example, the LCD display is hidden from viewing. The disclosed image expanding lens can enlarge the image to hide areas surrounding the display such as the device housing, providing a borderless device. In this way, smaller mobile communication devices may have borderless displays that seem larger than they are. That is, an electronic device incorporating the disclosed image expanding lens can render an edgeless image to a viewer since the image of the electronic device is projected beyond an edge of the display device of the host electronic device to possibly provide an overall better viewing experience.

A substrate in one embodiment has a wedge shape and has one surface that may be the top surface of the display device. The wedge-shaped portion of the substrate has an apex as its center, or other configuration in the center. In one embodiment, uniform prismatic films are attached to the oppositely oriented wedge-shaped portions of the substrate. An image projected from an LCD through the films and substrate, closest to the apex is not substantially shifted. However, the images projected close to the outer edges of the substrate and film, that is, those closest to the display device border, are substantially shifted, creating an expanded virtual image. To expand a displayed image on two sides, two films with opposite bending directions are placed, one or more on either side of the apex.

Figure 1:
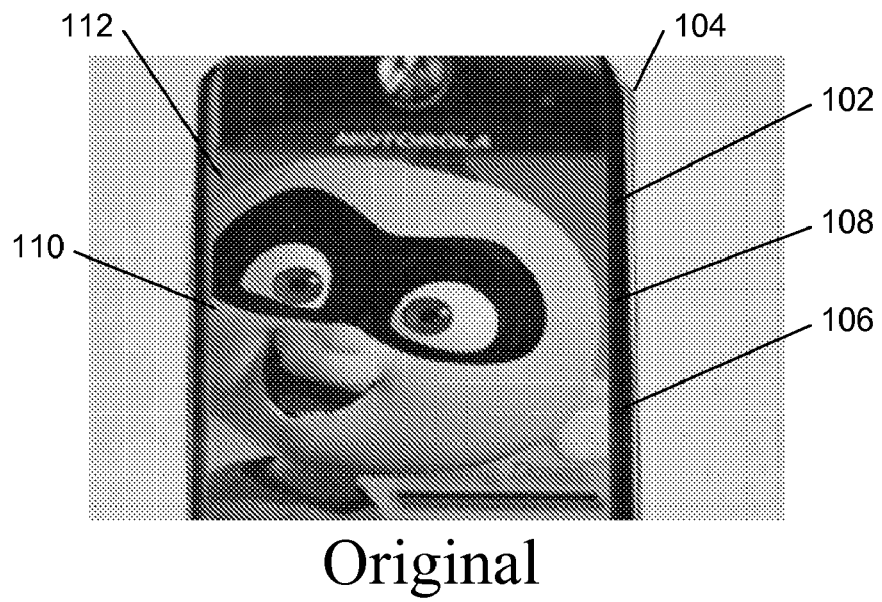
FIG. 1 depicts an image displayed on a display device that has not been expanded to illustrate the border around the edge of the image.

FIG. 1 depicts an image displayed on a display device that has not been expanded, to illustrate the border around the edge of the image. The display device 102 may be that of an electronic device such as a mobile communication device 104, the display device 102 supported by a housing 106. The border 108 on one side and border 110 on another side adjacent two sides of the display device 102 may include wire traces, a bezel, a gasket and the housing 106. The unexpanded image 112 may be generated by an LCD display module or other type of display device. The LCD display module 102 includes the active area from where an image is generated and projected and surrounding borders.

The electronic device 104, for example, may be a mobile communication device that may be implemented as a cellular telephone (also called a mobile phone). The electronic device and more in particular, a mobile communication device represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

Figure 2:
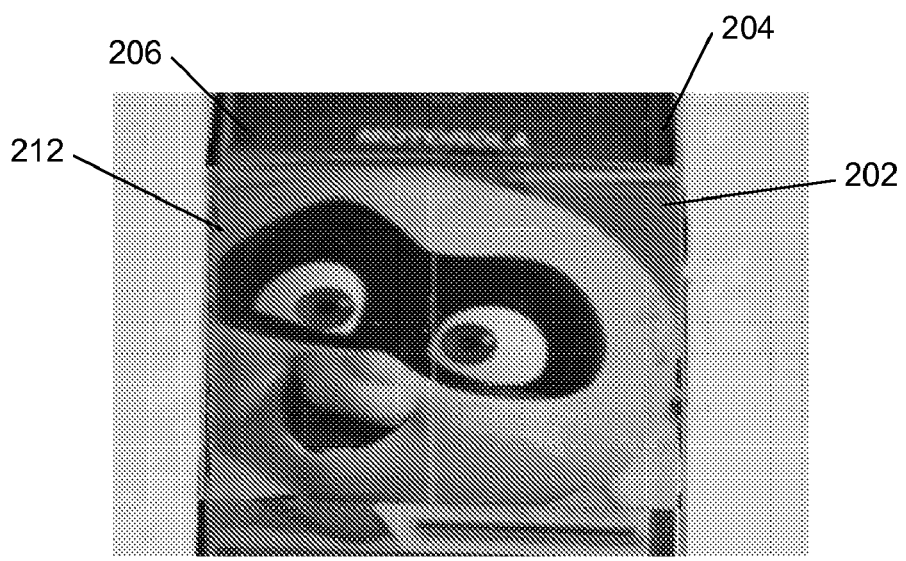
FIG. 2 depicts an image display on a display device that has been expanded by an embodiment of the described image expanding lens.

FIG. 2 depicts an image display on a display device that has been expanded by an embodiment of the described image expanding lens. The display device 202 may be that of an electronic device such a mobile communication device 204, the display device 202 supported by a housing 206. While the border 108 (see FIG. 1) on one side and the border 110 on another side adjacent two sides of the display device 202 are present as illustrated in FIG. 1, some or all of the border 108 and/or the border 110 is hidden by image 212 of the disclosed image expanding lens. Prismatic films alone or in combination with the substrate of the lens are able to bend the light from the LCD to cover the borders 108 and/or 110, essentially hiding them, as will be described in detail below. While borders 108 and 110 are depicted as those which are hidden in FIG. 2, it is understood that other and additional borders such as those at the top portion of the display device and the bottom portion of the display device may also be hidden in the described manner.

Figure 3:
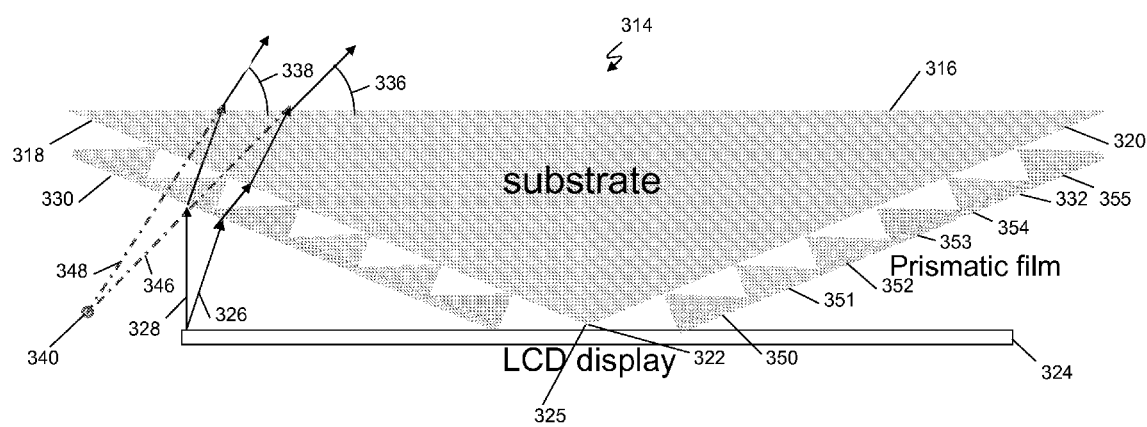
FIG. 3 illustrates an embodiment of the described image expanding lens and an LCD display in a side view.

FIG. 3 illustrates an embodiment of the described image expanding lens and an LCD display in a side view. As mentioned, a non-uniform transparent substrate 314, such as a substrate 314 having a wedge shape may be the top surface 316 of the display device 102 (see FIG. 1). A wedge shape may have at least three surfaces including a top surface 316, the wedge shape including a first substantially planar surface 318 at an angle with respect to the top surface 316 and a second substantially planar surface 320 at an angle with respect to the top surface 316, opposite the first substantially planar surface 318. In one embodiment, the angle formed between the top surface 316 and either planar surface 318 and/or 320 may be 11.3 degrees. It is understood that the angle formed between the top surface 316 and either planar surface 318 and/or 320 may be any suitable angle. In this way, the substrate's shape may have a minimal impact on the thickness of the display device. It is understood that substrate 314 may act as an optical element of the display device 202 (see FIG. 2). For example, the substrate 314 may provide refraction and image expansion for the display device 202, as described herein. In this manner the substrate may form a part of an image expanding lens or window for use with the display device 202.

In a mobile communication device 104 (see FIG. 1) the display device 102 may be a rectangular area, for example, of a size 2 inches by 3 inches. The thickness of the substrate 314, from the top surface 316, in this described embodiment, to its apex 322 may depend upon the amount of image 212 (see FIG. 2) expansion desired which may in turn depend upon the size of the border 108 and/or 110 to be hidden by the expanded image.

As mentioned above, described is a generic solution for a borderless display suitable for main stream LCD display modules 102 (see FIG. 1) as well as for other emerging direct-view display technologies such as organic light-emitting diodes (OLED) or electrophoretic displays (E-ink). The LCD display module 102 includes the active area where an image is generated, and surrounding borders 108 and 110. In this embodiment, showing a side view of an LCD display module 102, here the LCD display plane 324 may be close to or touch the substrate 314, here at the apex 322. In other embodiments, there may be an air gap between the LCD display 324 and the substrate 314. In an LCD display module the LCD display 324 plane (LCD layer) is sandwiched between two glass pieces and therefore in FIG. 3 top surface of the LCD display 324 is not necessarily depicted. So in this case, the substrate 314 may not actually touch the display plane 324. However, in other technologies such as in an e-ink display, the image may be displayed on the top surface of the display plane, and therefore the substrate 314 may be close to the top surface of the display plane. It is understood that the substrate 314 may or may not come into contact with a display plane 324 of a display device 204 depending upon the technology of the display device as well as the configuration of the substrate as discussed below.

In this described embodiment, the LCD display 324 may be composed of many pixels forming a pixel array which outputs light to form an image when combined at the surface of the display 202 (see FIG. 2). The LCD display 324 outputs light rays, for example, 326 and 328. That is, the depicted light rays 326 and 328 together with other light rays projected from the pixel area of the display 324 form an image. The light rays 326 and 328 are shown as passing through a first prismatic film 330 adjacent the first substantially planar surface 318. Similarly, light rays would pass through a second prismatic film 332 adjacent the second substantially planar surface (not shown in this figure). The first prismatic film 330 is configured to bend light 326 and 328 passing therethrough at an angle toward the direction of the second substantially planar surface 332. The second prismatic film 332 is configured to bend light (not shown) passing therethrough at an angle toward the direction of the first substantially planar surface 330. The light rays 326 and 328 exit the surface 316 of the substrate 314 at one or more angles 336 and 338 with respect to the surface 316. In one embodiment, the angles 336 and 338 are approximately 20 degrees. It is understood that the films and the substrate can be configured to cause the light to bend in the manner described at any suitable angle.

The films 330 and 332 may be adhered to the substrate 314 in any suitable manner. In the event that there is no air gap between the substrate 314 and the LCD display 324, the prismatic films 330 and 332 may have one of their sides touching each other and the center line 325 of the LCD display 324. In one embodiment, there may be index matching fluid between the films 330 and 332 to eliminate the appearance of a seam between them. The films 330 and 332, each with one side touching the display 324 and its opposite side away from the display 324 can create an expanded virtual image of the LCD display 324. Moreover, the substrate 314 not only supports the films 330 and 332 but may also further expand the image, by for example, 8 percent, and may also improve the image quality.

The angles 336 and/or 338, by which light rays 326 and 328 are shown as exiting the surface 316 of the substrate 314, create the illusion that the light rays 326 and 328 originate at point 340 which is outside the perimeter of the LCD display 324. For the light to appear to be projected from a point beyond the edge of the display plane, for example at point 340, the substrate 314 may be larger than the display active area of the LCD display 324. That is, an electronic device 204 (see FIG. 2) can render an edgeless image to a viewer since the image 212 of the electronic device 204 is projected beyond an edge of the display device of host electronic device 204.

Since the light rays 326 and 328 are bent, being transmitted at the surface of the substrate 314, the light appears to be generated at point 340, and to follow the paths 346 and 348. That is, the film 330 creates an expanded virtual image through prism ray bending. The films 330 and 332 on each face 318 and 320 of the substrate 314 have opposite orientations to one another so that light rays are bent inward and toward each other along the width direction of the surface of the display device 202 (see FIG. 2).

A uniform prismatic film can bend rays uniformly by a fixed angle. In particular, prisms 350, 351, 352, 353, 354, and 355 may be uniform. On the other hand, prisms 350, 351, 352, 353, 354, and 355 may be, for example, non-linear. Accordingly, variations in the prismatic film may create variations in the angle at which the rays are bent. Moreover, the substrate 314 that supports the films 330 and 332 may also bend the light ray further. In one embodiment, the substrate 314 may compensate for image uniformity distortion. For example, there may be facets (not shown) of the substrate 314. The facets of the substrate 314 may be, for example, nonlinear.

Figure 4:
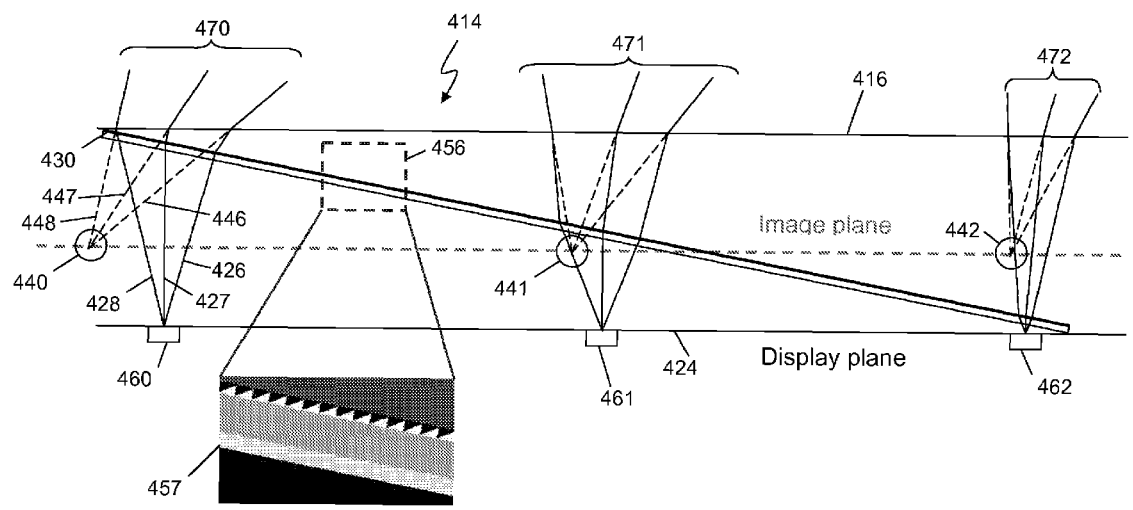
FIG. 4 depicts in more detail the directions in which the light output from the LCD display may be shifted along the direction opposite to the bending direction.

FIG. 4 depicts in more detail the directions in which the light output from the LCD display 424 may be refracted by the prismatic film and the surface of the substrate 314 (see FIG. 3) and shifted in the direction opposite to the bending direction. The LCD display 424 is composed of an array of pixels, three of which are depicted as pixels 460, 461 and 462. Light 470, 471 and 472 may be output from the pixels 460, 461 and 462 as depicted. The first prismatic film 430 is depicted with a portion 456 in the blown up illustration 457. The first prismatic film 430 is configured to bend light passing therethrough toward the direction of the second substantially planar surface 332 so that at least some of the light 470, 471, and 472 is refracted at the top surface 416 of the substrate 414 to enlarge an image of the display plane 424 so as to extend beyond an edge of the display plane 424. It is understood that some light may also be reflected at the top surface 416 of the substrate 414, but such internally reflected light does not contribute to enlargement of the display image. As discussed above, the light, in this case the refracted light 470, appears to be generated at point 440, and to follow the paths 446, 447, and 448.

The refracted light 472 toward the center of substrate 414 may not be substantially shifted. However, the refracted light 470 closest to the edge of the display 202 (see FIG. 2) near its borders 108 and 110 (see FIG. 1) is substantially shifted. Similarly, the reflected image 471 may be shifted an amount intermediate between the shift of rays 470 and the shift of rays 472. In this way, the film 430 and/or the substrate 414 creates an expanded virtual image through ray bending that appears to a user's eye to be output from beyond the edge of the display plane 424 (also see FIG. 3 point 340) and therefore, hides the border 108 and/or 110 to create a borderless display 202. In accordance with a disclosed image expanding lens, the image viewed by the user is larger than the active area of the LCD panel underneath the lens, so that the border around the LCD display is hidden from viewing. In this way, smaller mobile communication devices may have borderless displays that seem larger than they are. The described substrate 314 and films 330 and 332 therefore may create a clear image on a borderless display within the size constraints of a handheld device such as a mobile communication device 204. As mentioned above, the substrate may be of any suitable shape so that with suitable prismatic films, the light from the display device is bent to create the effect of a borderless display.

Figure 5:
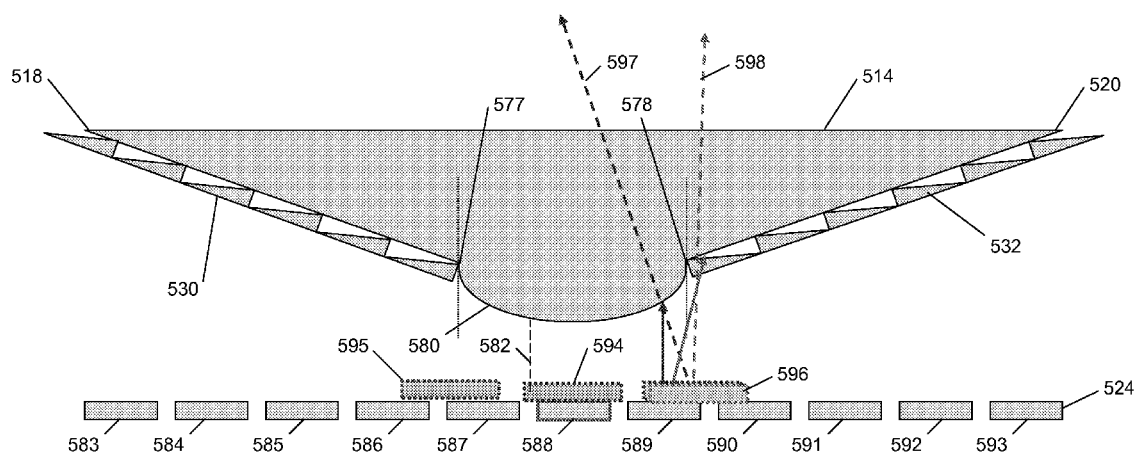
FIG. 5 depicts a side view of an embodiment of the substrate that has a rounded apex.

FIG. 5 depicts a side view of an embodiment of the substrate 514 that has a rounded apex 580. In this embodiment, an air gap 582 may be possible between the substrate 514 and the display panel 524. The rounded apex 580 may eliminate a possible dividing line that may be seen on an image 202 (see FIG. 2) that may be result from the embodiment of FIG. 3. Since the substrate 514 has a visual effect on the image, as do the prismatic films 530 and 532, the shape of the substrate 514, its faceting, and/or its non-linear surfaces may be used to create a uniform image expansion with the possibility of good image quality. In an embodiment with a rounded apex 580, the first substantially planar surface 518 is adjacent the rounded apex 580 and the second substantially planar surface 520 is adjacent the rounded apex 580.

The display panel 524 is depicted as having individual pixels 583, 584, 585, 586, 587, 588, 589, 590, 591, 592, and 593 for illustrative purposes. It is understood that the size of the pixels with respect to the substrate 514 would be smaller than depicted. The rounded apex 580 that is depicted as in the center of the substrate 514 can act as a small lens in the center of the substrate, and may have the same magnification as a prismatic film 530 and/or 532 to create a uniform image 202 (see FIG. 2). Pixels such as pixel 588 can be imaged by the lens of the rounded apex 580 and its image 594 may appear as an unaltered image of the pixel 588. Pixels under the transition area of the lens 577 and 578 such as pixels 587 and 589 may be imaged by both the lens of the rounded apex 580 and the films 530 and 532. Accordingly, the image generated by pixels 586 and 587, 595 and 596 respectively, may appear shifted from the pixels 586 and 587 with respect to the generated image 595 and pixels 589 and 590 with respect to the generated image 596.

As discussed above, light may be bent toward the opposite angled surface from which it is generated. Depicted is bent light output 597 that illustrates a similar principle as the light output 326 and 328 (see FIG. 3) where the light may be bent an angle toward the direction of the opposite planar surface 518. Conversely, light output 598 at the transition point where the rounded apex 580 meets the planar surface 520 and the prismatic film 532 may be transmitted without bending. It is understood to manipulate the bending of light output the angles of the substrate 514 including possible faceting, the curvature of the rounded apex 580, the structure facets of the prismatic films 530 and 532, can be of any suitable configuration to minimize thickness of the display device as a whole, and possibly create a clear, borderless image as described above.

The disclosed are image expanding lenses, display devices, and electronic devices incorporating the disclosed lenses can provide an image viewed by the user that is larger than the active area of the LCD panel underneath the lens, so that the border around, for example, the LCD display is hidden from viewing. In this way, smaller mobile communication devices may have borderless displays that seem larger than they are. That is, an electronic device can render an edgeless image to a viewer since the image of the electronic device is projected beyond an edge of the display device of host electronic device to possibly provide an overall better viewing experience.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the appended claims.

It is understood that the use of relational terms, if any, such as first and second, up and down, and the like are used solely to distinguish one from another entity or action without necessarily requiring or implying any actual such relationship or order between such entities or actions.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, and all equivalents thereof, when interpreted in accordance with the breadth to which they are fairly, legally and equitably entitled.

The invention claimed is:

1. An image expanding lens, comprising:
    a substrate having a wedge shape of at least three surfaces including a top surface, the wedge shape including a first substantially planar surface at an angle with respect to the top surface and a second substantially planar surface at an angle with respect to the top surface, opposite the first substantially planar surface;
    a first prismatic film adjacent the first substantially planar surface;
    a second prismatic film adjacent the second substantially planar surface;
    the first prismatic film configured to bend light passing therethrough at an angle toward the direction of the second substantially planar surface; and
    the second prismatic film configured to bend light passing therethrough at an angle toward the direction of the first substantially planar surface.

2. The lens of claim 1, wherein the substrate comprises a rounded apex and the first substantially planar surface is adjacent the rounded apex and the second substantially planar surface is adjacent the rounded apex.

3. The lens of claim 1 wherein:
    the first prismatic film configured to bend light passing therethrough toward the direction of the second substantially planar surface by approximately 20 degrees; and
    the second prismatic film configured to bend light passing therethrough toward the direction of the first substantially planar surface by approximately 20 degrees.

4. The lens of claim 1 wherein the angle of the first substantially planar surface with respect to the top surface is approximately 11.3 degrees and the angle of the second substantially planar surface with respect to the top surface is approximately 11.3 degrees.

5. A display device, comprising:
    a display plane having a plurality of edges; and
    a substrate adjacent to the display plane, the substrate having a wedge shape of at least three surfaces including a top surface, the wedge shape including a first substantially planar surface at an angle with respect to the top surface and a second substantially planar surface at an angle with respect to the top surface opposite the first substantially planar surface;
    a first prismatic film adjacent the first substantially planar surface;
    a second prismatic film adjacent the second substantially planar surface;
    the first prismatic film configured to bend light passing therethrough at an angle toward the direction of the second substantially planar surface; and
    the second prismatic film configured to bend light passing therethrough at an angle toward the direction of the first substantially planar surface.

6. A display device as recited in claim 5 wherein the first prismatic film configured to bend light passing therethrough toward the direction of the second substantially planar surface so that at least some of the light is refracted at the top surface to enlarge an image of the display plane beyond an edge of the display plane.

7. A display device as recited in claim 5 wherein the second prismatic film configured to bend light passing therethrough toward the direction of the first substantially planar surface so that at least some of the light is refracted at the top surface to enlarge an image of the display plane beyond an edge of the display plane.

8. The display device of claim 5 wherein:
    the first prismatic film configured to bend light passing therethrough toward the direction of the second prismatic film by approximately 20 degrees; and
    the second prismatic film configured to bend light passing therethrough toward the direction of the first prismatic film by approximately 20 degrees.

9. The display device of claim 5 wherein the angle of the first substantially planar with respect to the top surface is approximately 11.3 degrees and the angle of the second substantially planar surface with respect to the top surface is approximately 11.3 degrees.

10. The display device of claim 5, comprising:
    an air gap between the display plane and the substrate.

11. The display device of claim 5, wherein the substrate includes facets.

12. The display device of claim 11, wherein the facets of the substrate are nonlinear.

13. The display device of claim 5, wherein the display plane comprises pixels.

14. The display device of claim 5, wherein the substrate comprises a rounded apex and the first substantially planar surface is adjacent the rounded apex and the second substantially planar surface is adjacent the rounded apex.

15. The display device of claim 14, wherein there is a first transition area between the first substantially planar surface and the rounded apex and a second transition area between the second substantially planar surface and the rounded apex and wherein an image of the display plane is imaged by both the rounded apex of the substrate and the first film at the first transition area and by both the rounded apex of the substrate and the second film at the second transition area.

16. An electronic device including a display device comprising:
    a display plane having a plurality of edges; and
    a lens comprising:
    a substrate adjacent to the display plane, the substrate having a wedge shape of at least three surfaces including a top surface, the wedge shape including a first substantially planar surface at an angle with respect to the top surface and a second substantially planar surface at an angle with respect to the top surface opposite the first substantially planar surface;
    a first prismatic film adjacent the first substantially planar surface;
    a second prismatic film adjacent the second substantially planar surface;

the first prismatic film configured to bend light passing therethrough at an angle toward the direction of the second substantially planar surface; and the second prismatic film configured to bend light passing therethrough at an angle toward the direction of the first substantially planar surface.

17. The electronic device of claim 16, wherein the substrate comprises a rounded apex and the first substantially planar surface is adjacent the rounded apex and the second substantially planar surface is adjacent the rounded apex.

18. The electronic device as recited in claim 16 wherein the first prismatic film configured to bend light passing therethrough toward the direction of the second substantially planar surface so that at least some of the light is refracted at the top surface to enlarge an image of the display plane beyond an edge of the display plane; and wherein the second prismatic film configured to bend light passing therethrough toward the direction of the first substantially planar surface so that at least some of the light is refracted at the top surface to enlarge an image of the display plane beyond an edge of the display plane.

19. The electronic device as recited in claim 16 wherein the electronic device renders an edgeless image beyond at least one edge the display device.

* * * * *